United States Patent [19]

Youngquist

[11] 4,000,323

[45] Dec. 28, 1976

[54] SHAPED TEXTURED PROTEIN FOOD PRODUCT

[75] Inventor: Rudolph William Youngquist, Cincinnati, Ohio

[73] Assignee: The Procter & Gamble Company, Cincinnati, Ohio

[22] Filed: Feb. 13, 1976

[21] Appl. No.: 657,895

Related U.S. Application Data

[63] Continuation of Ser. No. 505,898, Sept. 16, 1974, abandoned.

[52] U.S. Cl. .................................. 426/93; 426/104; 426/274; 426/303; 426/802
[51] Int. Cl.² ........................ A23J 3/00; A23L 1/20
[58] Field of Search ............... 426/93, 96, 104, 656, 426/273, 274, 292, 293, 296, 302, 303, 305, 516, 805; 260/123.5

[56] References Cited

UNITED STATES PATENTS

| 2,668,766 | 2/1954 | Beckel et al. | 426/476 |
|---|---|---|---|
| 3,118,959 | 1/1964 | Westeen et al. | 264/202 |
| 3,343,963 | 9/1967 | Kjelson | 426/250 |
| 3,594,192 | 7/1971 | Mullen et al. | 426/573 |

OTHER PUBLICATIONS

Altschul, Aaron, Processed Plant Protein Foodstuffs, Academic Press, Inc. (1958), pp. 410–411.

*Primary Examiner*—A. Louis Monacell
*Assistant Examiner*—Esther L. Massung
*Attorney, Agent, or Firm*—Rose Ann Dabek; Jerry J. Yetter; Richard C. Witte

[57] ABSTRACT

A shaped protein food product comprising edible textured protein particles bound together by heat-set soybean protein isolate.

10 Claims, No Drawings

SHAPED TEXTURED PROTEIN FOOD PRODUCT

This is a continuation of application Ser. No. 505,898, filed Sept. 16, 1974, now abandoned.

BACKGROUND OF THE INVENTION

1. Field of the Invention

The field of this invention relates to textured protein food products, particularly meat analog food products formed from texturized protein.

2. Description of the Prior Art

Heretofore much work has been done to provide satisfactory meat analog food products. Meat analogs, or in other words, simulated meats, are generally formed from texturized protein particles.

A variety of prior art processes are known for "texturizing" vegetable protein, i.e., imparting to vegetable protein the chewy toughness and mouthfeel associated with meat, and assembling the texturized protein into familiar meat forms to provide meat analog products. For example, meat analog products can be made by processes involving fiber spinning or thermal plastic extrusion.

The fiber spinning technique is an adaptation of the spinnerette method of making synthetic textile fibers. In the meat analog adaptation of this method, fibrous textured protein products are prepared from proteins such as soy protein by forming a spinning dope from alkali solubilized protein and extruding the dope through a perforated die (spinnerette) into an acid (isoelectric) precipitating bath. The acidic bath sets the filaments or fibers as they emerge from the spinnerette. Thereafter, the fibers are collected for subsequent processing. The fibers, during the collection process, are usually stretched to orient the molecular structure of the fibers; thereafter, the fibers are assembled in "tows", bundles of individual fibers aligned in parallel fashion. Binding agents, coloring, fat and flavor can be added to the fiber tows and the entire fiber mass shaped to resemble familiar meat products. Details regarding the techniques are disclosed, for example, in U.S. Pat. Nos. 2,682,466, granted June 29, 1954, to Boyer; and 3,482,998, granted Dec. 9, 1969, to Carroll, et al.

The thermal plastic extrusion method of forming textured protein meat analog products is an adaptation of technology involved in making ready-to-eat cereal food products. The thermal plastic extrusion process involves preparing a mixture of protein material, water, flavor and other ingredients and thereafter feeding the mixture into a cooker extruder wherein it is subjected to heat and pressure and subsequently extruding the mixture. The extrudate filament as it enters into a medium of reduced pressure (usually atmospheric) expands to form a fibrous cellular structure. On rehydration, the fibrous filamentary texturized protein product can possess an appearance, a bite and mouth feel comparable to cooked hamburger. Details regarding thermal plastic extrusion techniques for the forming of textured protein meat analogs are disclosed, for example, in U.S. Pat. Nos. 3,488,770, granted Jan. 6, 1970, to Atkinson; and 3,496,858, granted Feb. 24, 1970, to Jenkins. With the use of suitable binders, products similar to hamburger patties, meat balls, meat loaves and meat chunks can be formed. A variety of other processes are known for providing very suitable texturized proteins which approach the texture and appearance of the textured protein of natural meats.

Textured proteins are generally obtained in the form of particles, for example, fiber pieces, fibrous extrudate filaments, or granules. These particles must be bound together to form shaped meat analog products, for example, beef chunk analogs, chicken analogs, hamburger patty analogs and meat loaf analogs. To hold these particles together, a suitable binder is required. To be acceptable, a suitable binder must have at least the following characteristics. It must present a reasonably bland or meat-compatible taste. It must bind effectively. It must heat-set under mild conditions which will not adversely affect the protein particles. It must provide a product with an acceptable meat-like texture and mouthfeel when heat-set.

Heretofore, the really suitable binding materials for meat analog products and natural extended meat products such as meat loaves and croquettes have involved the use of egg white. Egg white can be an excellent binding material, but the supply of egg white is limited and the cost is high. Attempts have been made heretofore to replace a portion of the egg white as the binding material in meat analog products. For example, U.S. Pat. No. 3,343,963, granted Sept. 26, 1967, to Kjelson discloses a three component binder system comprising albumen, gluten and particulate defatted oilseed material; and U.S. Pat. No. 3,594,192, granted July 20, 1971, to Mullen, et al., discloses a binder comprising egg white and a modified soy protein. The latter patent discloses that the binding properties of soybean protein are improved by a process of treating soybean protein involving raising an aqueous dispersion of soybean protein to above about pH 9 and then reducing the pH to 5.5 to 8. While the treated soybean protein may exhibit improved binding properties, it is not a suitable binder as such. This binder still requires the presence of egg white.

A preferred binder would be one derived from an abundant available vegetable source. The prior art does not disclose, however, vegetable materials known to function as really suitable binders for textured protein foods.

Soybean protein is a material which is in abundant supply. It would be very desirable, therefore, if this material could function as a suitable binder in textured protein food products.

SUMMARY OF THE INVENTION

In summary, it has been found that soybean protein solubilized in water at a pH greater than 9 and a leavening acid provides an excellent binder for textured protein food products. More particularly, this invention provides a process for forming shaped textured protein food products comprising (1) coating particulate textured protein material with soybean protein solubilized in water with an alkaline material providing a pH greater than 9 and an amount of leavening acid which, when heated, will react with the alkaline material to provide a pH of from 5.5 to 7.5; (2) shaping the coated particulate material into a unitary shaped product; and (3) heating the shaped product to heat-set the binder. In another aspect, this invention provides the novel protein food products formed by this process.

DETAILED DESCRIPTION OF THE INVENTION AND ITS PREFERRED EMBODIMENTS

This invention provides new shaped textured protein food products formed by a process comprising the steps of (1) coating particulate textured protein material with soybean protein solubilized in water with an alkaline material providing a pH greater than 9 and an amount of leavening acid which, when heated, will react with the alkaline material to provide a pH of from 5.5 to 7.5; (2) shaping the coated particulate material into a unitary shaped product; and (3) heating the shaped product to heat-set the binder.

The product of this process is a novel shaped protein food product comprising particulate textured protein particles bound together by heat-set soybean protein.

As used herein "particulate textured protein material" means a plurality of edible protein particles which have a hydration capacity of from about 1 to 4 times their weight of water, and when hydrated, remain particulate (maintain their structural integrity) and have a chewy texture characteristic of meat.

The term "chewy texture" refers to and includes the physical characteristic of the protein material which causes such materials when chewed in the mouth to present the properties of resilience, elasticity and resistance to shear characteristic of meat. This chewy texture is preferably evaluated subjectively by chewing the protein, however, this texture of the protein material can be expressed in shear press values. Suitable textured protein material for use herein includes protein material having a shear press value in the range of 300 to 1500 pounds determined according to the method disclosed in U.S. Pat. No. 3,778,522, granted Dec. 11, 1973, to Strommer.

The term "hydration capacity" as used herein refers to the total amount of water the dry protein material is able to hold and is determined by soaking dry textured protein particles in excess water for 30 minutes and then draining for 5 minutes. The hydration capacity is the weight of water retained per unit weight of the dry protein material.

The term "shaping" as used herein refers to any physical operation such as molding and pressing which causes a plurality of particulate textured protein particles to be aggregated together as a unit and conform to a particular configuration.

The term "leavening acid" means a compound which neutralizes alkaline material rapidly only with the application of heat. The following are examples of commercially available leavening acids.

| Leavening Acid | Formula |
|---|---|
| Monocalcium phosphate monohydrate | $CaH_4(PO_4)_2 \cdot H_2O$ |
| Monocalcium phosphate anhydrous | $CaH_4(PO_4)_2$ |
| Sodium acid pyrophosphate | $Na_2H_2P_2O_7$ |
| Sodium aluminum phosphate | $NaH_{14}Al_3(PO_4)_8 \cdot 4H_2O$ |
| Dicalcium phosphate dihydrate | $CaHPO_4 \cdot 2H_2O$ |
| Sodium aluminum sulfate | $Al_2(SO_4)_3 \cdot Na_2SO_4$ |
| Glucono-δ-lactone | $C_6H_{10}O_6$ |
| Cream of tartar (potassium hydrogen tartrate) | $KHC_4H_4O_6$ |
| Dipotassium acid phosphate | $K_2HPO_4$ |
| Monopotassium acid phosphate | $KH_2PO_4$ |

Each of these leavening acids or mixtures thereof are suitable for use herein.

A variety of alkaline materials are available which provide a pH above 9. Preferred materials are inorganic bases such as sodium hydroxide, potassium hydroxide, calcium hydroxide and trisodium phosphate.

In forming many desirable food products within the scope of this invention, it will be preferred to use particulate textured protein materials which have physical characteristics which meet proposed USDA-FNS specification for textured meat alternatives set forth in the Federal Register, Vol. 39, p. 11,297, dated Mar. 27, 1974.

Suitable particulate textured protein materials for use herein can consist of from 30 to 100% protein, on a dry weight basis, and from 0 to 70% materials associated with the protein source material or added adjuvant materials. Examples of adjuvant materials are carbohydrates, vitamins, and flavors, etc. Preferably, the protein particles consist of 50 to 100% protein, and most preferably 50 to 80% protein on a dry weight basis.

The size and shape of the particulate textured protein material is not a critical aspect of this invention and can be selected to achieve the product characteristics desired. The particulate protein material is preferably fibrous since this protein material can be formed into very desirable fibrous meat analog food products.

Meat is an example of textured protein material. It is important to note, however, that proteins which are not textured can be texturized to form textured protein. These texturized proteins are preferred for use herein.

Suitable untextured proteins which can be texturized to form textured particulate protein materials are available from a variety of sources. The preferred source of such proteins is vegetable protein; however, animal protein can be employed. Examples of suitable animal proteins are casein and egg white. Examples of suitable vegetable protein sources are soybeans, safflower seed, corn, peanuts, wheat, peas, sunflower seed, cottonseed, coconut, rapeseed, sesame seed, leaf proteins, single cell proteins such as yeast, and the like. Generally, if the protein source is a vegetable protein, the protein prior to use is placed in a relatively pure form. Thus, for example, if the protein source is soybeans, the soybeans can be dehulled and solvent extracted, preferably with hexane, to remove the oil therefrom. The resulting oil-free soybean meal contains about 50% protein.

The soybean meal can be processed in known manner to remove carbohydrates and obtain products with higher levels of protein, for example, soy protein concentrates containing about 70% protein or soy protein isolates containing about 90% or more protein. In turn, a variety of suitable prior art processes can be employed to convert the soybean meal, concentrate, isolate and other edible protein bearing materials into suitable texturized particulate protein materials.

Suitable methods for converting untextured animal and vegetable protein bearing materials into particulate textured proteins are disclosed, for example, in the following U.S. Pat. Nos. 2,682,466, granted June 29, 1954, to Boyer; 3,142,571, granted July 28, 1964, to Kitchel; 3,488,770 granted Jan. 6, 1970, to Atkinson; 3,498,794 granted Mar. 3, 1970, to Calvert, et al.; 3,759,715 granted Sept. 18, 1973, to Loepiktie, et al.; 3,778,522 granted Dec. 11, 1973, to Strommer; 3,794,731 granted Feb. 26, 1974, to Dannert, et al.; 3,814,823 granted June 4, 1974, to Yang, et al.; and commonly assigned U.S. patent application Ser. No. 248,581, filed Apr. 28, 1972, now U.S. Pat. No. 3,840,679, granted Oct. 8, 1974, to Liepa, et al.; all said patents being incorporated herein by reference.

The most suitable particulate textured proteins are protein fibers with a cross-section of from about 20 to about 500 microns. The fibers can be in form of a fiber bundle (tow) comprised of numerous fibrous filaments having a substantially larger cross-section. Especially suitable particulate proteins are fibrous cellular texturized proteins formed by expansion, for example, texturized proteins formed by extrusion as mentioned hereinbefore.

It has been found that soybean protein solubilized in water with an alkaline material at pH 9 or higher, preferably pH 10 to 12, can be a very effective binder for particulate textured protein materials. While this was a valuable discovery, a binder with such an alkaline pH presents serious taste problems. (An acceptable meat flavor pH range is from 5.5 to 7.5; pH values outside this range present progressively less acceptable flavor.) If the pH is lowered with an acid prior to heat-setting, however, binding effectiveness is substantially reduced. It has now been found that effective binding and an acceptable meat flavor pH of 5.5 to 7.5 can be obtained by incorporating a leavening acid with the alkaline solubilized soybean protein prior to heat-setting. On heat-setting, the soybean protein binds effectively, and the leavening acid reacts with the alkaline material to provide a suitable pH of 5.5 to 7.5.

The soybean protein material utilized in the binder can be a soybean protein isolate or concentrate containing at least 70% by weight protein. Isolates normally contain over 90% by weight protein and are preferred for use herein. Such isolates can be obtained by alkaline extraction and acid precipitation using conventional techniques. For example, they can be prepared by the extraction of defatted soybean flakes or similar source material with dilute aqueous solutions of sodium hydroxide and subsequent precipitation of the extracted protein with an acid at the isoelectric point. The soybean protein is preferably isolated under mild conditions such that the protein is substantially undenatured.

The particular amount of leavening acid employed will depend on the amount of alkaline material and the particular leavening acid. A suitable amount of leavening acid is an amount which will provide a pH of from 5.5 to 7.5.

Because of flavor effects, it is desirable that the leavening acid be balanced off with the alkaline material employed to solubilize the soybean protein isolate such that little, if any, unchanged reactants (alkaline and acid materials) remain in the finished product. The use of a proper balance of leavening acid will result in an essentially neutral product. An excess of alkaline material will impart an undesirable soapy taste to the product. An excess of acid can impart an undesirable bitter or tart taste. (Small amounts of remaining acid can provide taste characteristics which compliment meat flavor, for example, amounts providing a pH of 6.0 – 6.9 can compliment rare beef flavor notes.) The most suitable amounts of alkaline and acid materials employed can be readily determined using methods well known to those skilled in the art. (See, Kirk-Othmer, Encyclopedia of Chemical Technology, 2d. Ed. Vol. 3., pages 52–59.)

The soybean protein is generally prepared for use by mixing water, soybean protein and alkaline material to form a moist tacky binder composition. This binder composition is generally from 30 to 90%, by weight, water and preferably from 50 to 80%, by weight, water.

The leavening acid and moist binder can be coated onto the particulate protein material simultaneously, or the leavening acid can be coated onto particulate protein material previously coated with the moist binder.

A variety of known techniques can be employed to coat the particulate textured protein material with the binder and leavening acid. For example, these materials can be sprayed or metered onto the textured protein particles, or these materials and the textured protein particles can be combined together and mixed, for example, by tumbling the combination in an inclined rotating drum.

Preferably, the particulate textured protein material to be coated with the binder is hydrated with 1 to 3 times its dry weight water. While it is preferred that both the particulate protein and the binder be moistened prior to mixing, the materials can be mixed together dry prior to adding the required water.

The soybean protein binder is employed in an amount sufficient to provide a food product bound together to the desired extent after a heat-setting step. The particular amount of binder most suitably employed, will, of necessity, vary somewhat with the particular food product formulated. In general, the ratio (dry weight basis) of the soybean protein binder to particulate protein will be in the range of from about 2:1 to 1:10, preferably from about 1:1 to 1:8, and more preferably 1:2 to 1:8. Real or analog meat patties, meat loaves, and meat balls require a lesser degree of binding, and hence less binder can be employed; whereas analog meat chunks require a higher degree of binding, and hence more binder, to achieve the toughness associated with the mouthfeel of beef chunks.

The textured particulate protein material coated with a suitable amount of soybean protein binder and leavening acid is then shaped into unitary food products, for example, real or analog meat patties, meat loaves, meat balls or meat chunks or slabs. The shaping can be done by hand, or suitable molds, forms, presses or converging conveyer belts can be employed. Preferably, the products are shaped to resemble familiar meat products, for example, hamburger patties, meat balls, or beef chunks.

These moist shaped unitary food products comprised of particulate protein are then heat-set to complete the binding process. Heat-setting denatures the soybean protein such that it becomes insoluble firmly binding the textured protein particles together. In general, temperatures within the range of from 120° F to 450° F, preferably 150° F to 400° F, will suitably heat-set the binder. At these temperatures, the leavening acid rapidly reacts with the alkaline material to provide a shaped product with a pH of from 5.5 to 7.5.

The time necessary to provide good heat-setting at a particular temperature will vary significantly depending on the temperature and thickness of the shaped protein product. A relatively thin patty can generally heat-set in two to thirty minutes, whereas a thick product such as a meat loaf can require several hours.

Suitable heat-setting temperatures are attained in a variety of operations; for example, baking, frying, or microwaving the shaped product will heat-set the binder satisfactorily.

The resulting unitary shaped food product is a novel protein food product comprising a plurality of textured protein particles bound together by heat-set soybean protein. The shaped product can be frozen or dehydrated and stored for later use. The dehydrated product can be re-hydrated to provide very suitable food products.

The food products of this invention will often contain additional ingredients to impart desirable taste and appearance characteristics to the product. The binder can often be a desirable carrier for these ingredients.

In this regard, the binder composition can often desirably include, in addition to the above-described binder ingredients, other edible ingredients such as flavoring agents, coloring agents, oils and fats and the like. For example, various meat flavors which are available commercially can be added. Representative thereof are bouillon cubes having chicken, beef and other meat flavors. Synthetic ham, bacon and sausage flavors may also be used. Additionally, various spices and salts can be employed to provide further flavor. The coloring agents may be dyes or other coloring materials which can simulate the color of meat.

Vegetable oils and animal fats and oils can also be added to the binder mixture. Representative thereof are soybean oil, cottonseed oil, corn oil, coconut oil, palm kernel oil, olive oil, peanut oil, sesame seed oil, safflower oil, tallow, lard, chicken fat, butter, cod-liver oil and the like. The oils and fats may be partially or fully hydrogenated.

A binder composition containing fat and flavor, for example, can be emulsified and the emulsion mixed with the particulate textured protein material to provide an even distribution of the binder, fat and flavoring agents. If desirable, an edible emulsifier can be employed to aid formation of such an emulsion. Representative of such emulsifiers are: Mono- and diglycerides of fatty acids, such as monostearin, monopalmitin, monoolein, and dipalmitin; higher fatty acid esters of sugars, such as sucorse partial palmitate and sucrose partial oleate; phosphoric and sulfuric acid esters, such as dodecyl glyceryl ether sulfates and monostearin phosphate; partial esters of glycerol and both higher and lower fatty acids, such as glyceryl lactopalmitate; and polyoxyalkylene ethers of fatty esters of polyhydric alcohols, such as the polyoxyethylene ethers of sorbitan monostearate and sorbitan distearate.

While the amount of the additional ingredients in proportion to the soybean protein binder can vary over a wide range, the amount of these additional ingredients should not so dilute the soybean protein binder such that it becomes ineffective.

The following examples illustrate specifically several embodiments of the invention disclosed herein.

EXAMPLE I

A particulate textured soy protein material was obtained by extruding a commercially available soy concentrate (containing about 70% protein) in a known manner as follows:

Sixty-five parts soy concentrate were mixed with 35 parts water, and the pH of the mixture was adjusted to 5.8 with HCl.

The resulting composition was extruded in a Brabender Model 2503 extruder equipped with a medium compression (2:1) screw and an extrusion die containing a 3/16 inch diameter orifice. The extruder was maintained at a temperature of 175° C at the extrusion die and the front end of the barrel. The screw was rotated at a rate of 200 rpm.

The extruded product expanded rapidly on emerging from the die while releasing steam. The resulting product was a fibrous protein filament. The filament was chopped into pieces having a length of about one inch. The fibrous protein filament product was dried in an oven at 60° C for 7 hours to obtain a storage stable product. When the dry product is added to water, it absorbs approximately three times its dry weight of water. The resulting hydrated product resembles loose cooked ground hamburger meat in appearance and texture, and is characterized as a hamburger analog.

A binder was formed by mixing 4.0 parts soybean protein isolate, 0.3 parts calcium hydroxide, 0.06 parts sodium hydroxide, and 9.64 parts water. This mixture was stirred until the soybean protein was solubilized. The resulting binder is a moist tacky material having a pH of about 10.5.

Fourteen parts of this binder were added to 20 parts hamburger analog (dry weight basis) hydrated with 30 parts water and mixed together, coating the analog particles with the binder. The resulting mixture of analog and binder has a pH of about 9.7. (This pH was determined by slurrying 5 grams of the mixture in 100 grams water with mixing for 30 minutes, and measuring the pH of the water.) There was then added to the analog particles coated with binder 1 part of powdered potassium acid phosphate ($KH_2PO_4$). This addition was done with continuous mixing to provide even coating of the mixture.

Fifty grams of this mixture were pressed in a hamburger patty mold, and shaped into a circular patty having a diameter of 3⅜ inches and a thickness of ⅜ inch. The shaped patty was then placed in a microwave oven and microwaved for five minutes (providing a temperature of about 200° F) to heat-set the binder.

The extruded protein particles were bound together providing an all vegetable protein food product which closely resembled a hamburger patty in appearance, handling characteristics and mouthfeel. The product is characterized as a hamburger patty analog. The pH of the heat-set patty (determined according to the method mentioned above) was 6.5. The patty had a suitably bland meat compatible taste so that it can be flavored appropriately.

EXAMPLE II

When in Example I, monocalcium phosphate monohydrate, monocalcium phosphate anhydrous, sodium acid pyrophosphate, sodium aluminum phosphate, dicalcium phosphate dihydrate, sodium aluminum sulfate, glucono-γ-lactone, cream of tartar (potassium hydrogen tartrate), and dipotassium acid phosphate or mixtures thereof are used in amounts providing a similar pH, similar results are obtained.

EXAMPLE III

When in Example I, meat flavor ingredients are added to the textured protein and/or binder, a flavored hamburger patty analog is obtained which presents beef flavor unimpaired by pH.

EXAMPLE IV

When in Example I, the shaped patty is fried on each side for three minutes at 240° F to heat-set the binder, substantially the same results are obtained.

It has been found that the addition of about 5 grams liquid soybean oil and 1 gram lecithin to the binder composition in the above examples provides a hamburger patty analog which presents a more moist and juicier mouthfeel.

All parts and percentages herein are on a weight basis unless otherwise specified.

What is claimed is:

1. A process for forming textured shaped protein food products comprising 1. coating particulate textured protein material with a binder consisting essentially of soybean protein solubilized in water with an alkaline material providing a pH greater than 9 and simultaneously or as a second step admixing said particulate protein material and binder with an amount of leavening acid which, when heated, will react with the alkaline material to provide a pH of from 5.5 to 7.5;
2. shaping the particulate material from step (1) into a unitary shaped product; and
3. heating the shaped product to heat-set the binder.

2. The process of claim 1 wherein the soybean protein is soybean protein isolate.

3. The process of claim 2 wherein the alkaline material provides a pH of from 10 to 12.

4. The process of claim 3 wherein the particulate textured protein material is hydrated with from 1 to 3 times its dry weight of water.

5. The process of claim 4 wherein the shaped protein product is heated to a temperature of 120° F to 450° F to heat-set the binder.

6. The process of claim 5 wherein the textured protein is texturized vegetable protein.

7. The process of claim 6 wherein the textured protein is fibrous texturized vegetable protein.

8. The process of claim 7 wherein the texturized protein is soybean protein.

9. The process of claim 8 wherein the temperature is from about 150° F to 400° F.

10. The product of the process of claim 1.

* * * * *